United States Patent
Moon et al.

(10) Patent No.: US 6,600,771 B1
(45) Date of Patent: Jul. 29, 2003

(54) SPREAD SPECTRUM PHASE MODULATION FOR SUPPRESSION OF ELECTROMAGNETIC INTERFERENCE IN PARALLEL DATA CHANNELS

(75) Inventors: Yongsam Moon, Incheon (KR); Deog-Kyoon Jeong, Seoul (KR); Gyudong Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 09/234,777

(22) Filed: Jan. 20, 1999

Related U.S. Application Data
(60) Provisional application No. 60/071,805, filed on Jan. 20, 1998.

(51) Int. Cl.[7] ................................. H04B 1/69
(52) U.S. Cl. .................... 375/130; 375/133; 375/141; 375/146; 375/147; 327/269
(58) Field of Search ................. 375/130, 133, 375/141, 146, 147, 270; 327/231, 234, 257, 258, 269, 298, 299, 156, 551; 709/231

(56) References Cited

U.S. PATENT DOCUMENTS

| | | | |
|---|---|---|---|
| 5,283,807 A | | 2/1994 | Graham ..................... 375/130 |
| 5,731,728 A | * | 3/1998 | Greiss ..................... 327/299 |
| 5,889,819 A | * | 3/1999 | Arnett ..................... 375/270 |
| 5,974,464 A | * | 10/1999 | Shin et al. ................ 709/231 |
| 6,144,242 A | * | 11/2000 | Jeong et al. .............. 327/269 |
| 6,333,896 B1 | * | 12/2001 | Lee ........................... 365/233 |

FOREIGN PATENT DOCUMENTS

| | | | | |
|---|---|---|---|---|
| DE | 195 17 265 A | | 11/1996 | ........... H04B/15/02 |
| EP | 0 828 360 A | | 3/1998 | ........... H04B/15/02 |

OTHER PUBLICATIONS

All–Digital Multi–Phase Delay Locked Loop for Internal Timing Generation in Embedded and/or High–Speed DRAMs by Kohtaroh Gotoh, Shigetoshi Wakayama, Miyoshi Saito, Junji Ogawa, Hirotaka Tamura, Yoshinori Okajima and Masao Taguchi 1977 Symposium on VLSI Circuits—Digest of Technical Papers, Jun. 12–14, 1997, pp. 107–108.

Principles of Electromagnetic Compatibility, $3^{rd}$ Edition, Oct. 1986, pp. 25–34, Artech House, Inc.

Communication Systems by Simon Haykin, $3^{rd}$ Edition, Date Unknown, pp. 578–611 John Willy & Sons, Inc.

* cited by examiner

*Primary Examiner*—Shuwang Liu
(74) *Attorney, Agent, or Firm*—Perkins Coie LLP

(57) ABSTRACT

A new spread spectrum phase modulation (SSPM) technique is applicable to both data and clock signals. The SSPM technique is more suitable to board level designs than the direct-sequence spread spectrum (DSSS) technique. In addition, SSPM may be combined with controlled edge rate signaling to outperform DSSS.

9 Claims, 8 Drawing Sheets

Transmission of data and clock without skew error in spread spectrum phase modulation

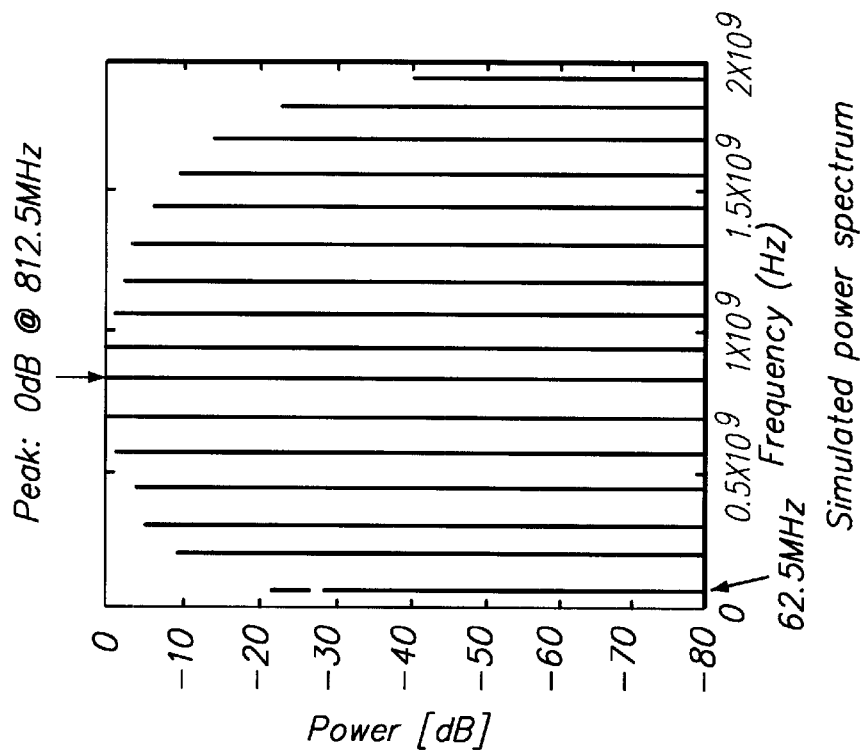
FIG. 2C
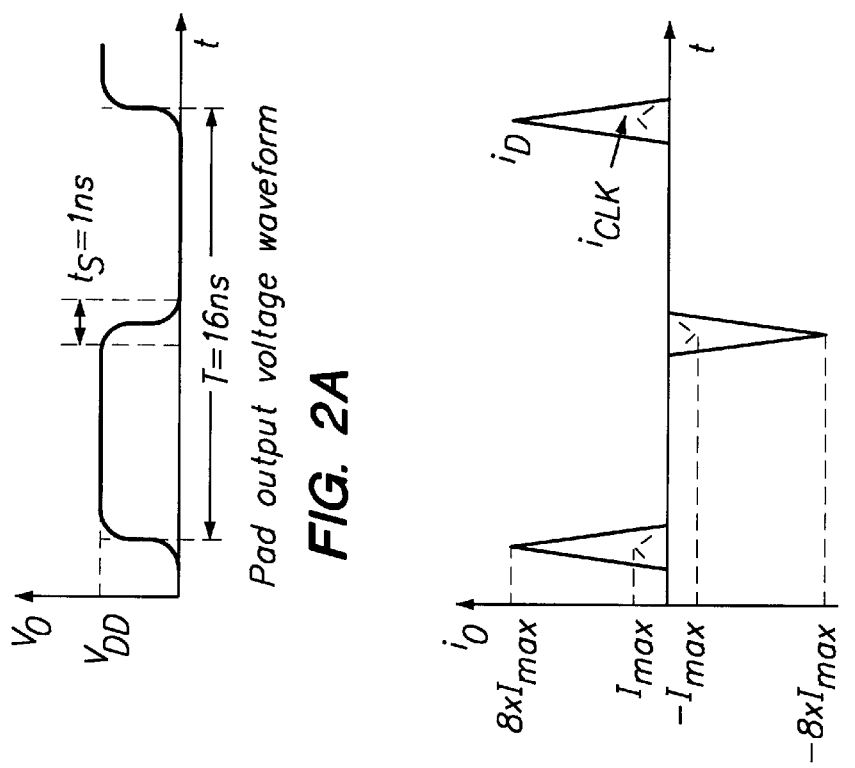
FIG. 2A
FIG. 2B

Simulated spectrum and EMI reduction

Direct-sequence spread spectrum

Spread of data power

Simulated power spectrum in case of SSPM + ITT

Output voltage waveform

Output current waveform

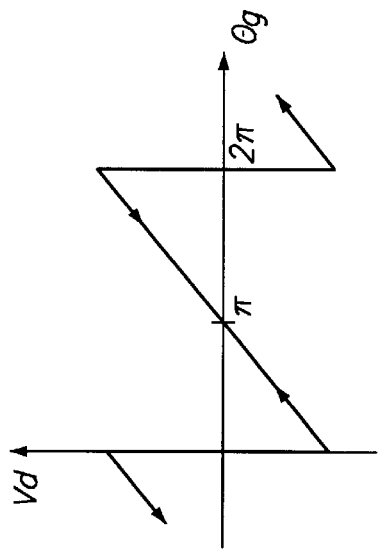
FIG. 8B Phase detection
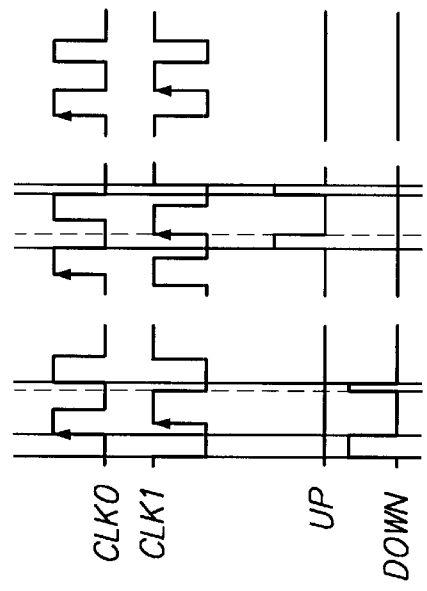
FIG. 8C Phase difference vs. control voltage variation
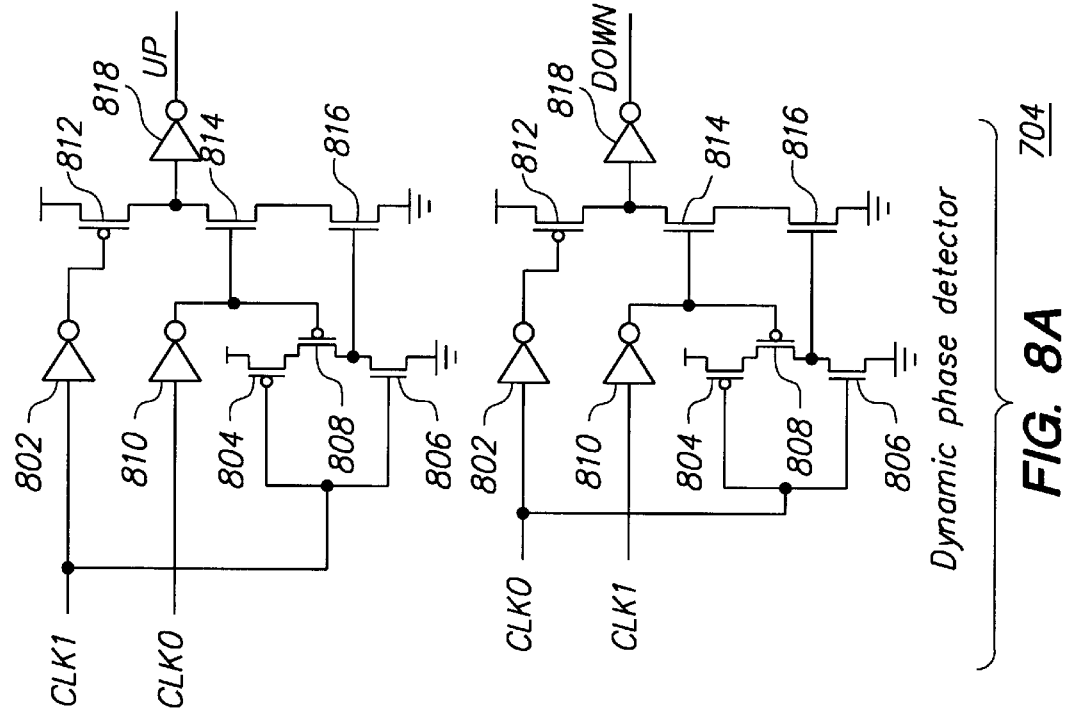
FIG. 8A Dynamic phase detector

US 6,600,771 B1

SPREAD SPECTRUM PHASE MODULATION FOR SUPPRESSION OF ELECTROMAGNETIC INTERFERENCE IN PARALLEL DATA CHANNELS

CROSS-REFERENCE TO RELATED APPLICATIONS

This application claims the benefit of prior filed copending provisional application Ser. No. 60/071,805, titled "Suppression of Electromagnetic Interference in Parallel Data Channels through Spread Spectrum Phase Modulation," filed on Jan. 20, 1998 by inventors Yongsam Moon, Deog-Kyoon Jeong, and Gyudong Kim.

BACKGROUND OF THE INVENTION

1. Technical Field

The present invention relates generally to electronic circuitry for parallel clock and data transmission. More particularly, the present invention relates to reducing electromagnetic interference (EMI) during such transmission.

2. Description of Related Art

As electronic and computer technology continues to evolve, communication of data among different devices, either situated nearby or at a distance, becomes increasingly important. It is also increasingly desirable to provide such data communications at very high speeds, especially in view of the large amount of data required for data communications in intensive data consuming systems using graphical or video information, multiple input-output channels, local area networks, and the like. Hence, it is now more desirable than ever to provide for high speed data communications among different chips on a circuit board, different circuit boards in a system, and different systems with each other.

A problem of increasing significance for such data communications is substantial electromagnetic interference (EMI) radiation, often exceeding acceptable levels. As the number of data lines and the rate of data driving and transmission increases, the EMI emitted increases correspondingly.

An early prior art method of reducing EMI radiation involves physical shielding. Physical shielding may reduce EMI radiation, but physical shielding may be cumbersome and costly, and may not be effective enough to sufficiently reduce EMI radiation depending on the frequencies involved.

Electromagnetic interference may have an adverse influence on the operations of electronic equipment. Thus, there are strict regulations on electromagnetic emission covering both industrial and consumer electronic equipment. Recently, there is increasing pressure to reduce EMI from such equipment.

An on-board parallel clock and data channel as shown by the example in FIG. 1 is a primary source of EMI for some systems. In the following analysis, we assume a dual edge clocking scheme for simplicity and since it is more favorable to the EMI problem. In the far-field, each metal wire may be considered as a single point, and the EMI power radiated by the wire trace is calculated as $P(f) \, I^2(f) \cdot f^2$, where f is the signal frequency and I(f) is the current through the wire. For example, assuming that 8 bit data wires carry an identical alternating 01 sequence with a clock of 62.5 megahertz (MHz) with rising and falling times of 1 nanosecond (ns), an EMI peak occurs at 812.5 MHz as shown in FIG. 2(c). Note that only the current waveform shown in FIG. 2(b) is related with EMI rather than the voltage waveform shown in FIG. 2(a).

In order to reduce the peak EMI, either the power spectrum of EMI must be evenly spread over a wide frequency range or high frequency components of the current must be reduced.

One of the conventional techniques is direct-sequence spread spectrum (DSSS), where each data is exor'ed with a pseudo-random sequence and then exor'ed with the same sequence to recover data in the receiver. This spreads the data in frequency prior to transmission and "despreads" it at the receiver, as shown by the example illustrated in FIG. 3.

However, the DSSS technique has a substantial disadvantages and problems. One disadvantage is that the DSSS technique can be applied to data signals, but not to a clock signal. This is because the clock signal must be glitch and jitter free. In the example shown in FIG. 3, the EMI reduction is merely to negative 19.1 dB (decibels) at 812.5 MHz, and the remaining peak arises primarily from the unspread clock line. [1 dB=10 $\log_{10}$ ($P_2/P_1$), where $P_1$ and $P_2$ represent the power of two signals.] One of the problems is that the DSSS technique requires pseudo-random (PN) code generators in both transmitter and receiver for scrambling/descrambling and synchronization between transmitter and receiver.

SUMMARY OF THE INVENTION

The above described problems and disadvantages are overcome by the present invention. The present invention relates to a new spread spectrum phase modulation (SSPM) technique that is applicable to both data and clock signals. The SSPM technique is more suitable to board level designs than the direct-sequence spread spectrum (DSSS) technique. In addition, SSPM may be combined with controlled edge rate signaling to outperform DSSS.

BRIEF DESCRIPTION OF THE DRAWINGS

FIG. 2(a) is a graph illustrating a voltage waveform output by a pad of a transmitter to a wire of a channel.

FIG. 2(b) is a graph illustrating a current waveform output by a pad of a transmitter to a wire of a channel.

FIG. 2(c) is a graph illustrating a power spectrum due to the current waveform of FIG. 2(b).

FIG. 8(a) is a schematic diagram showing circuitry for a T/2 Phase Detector in accordance with a preferred embodiment of the present invention.

FIG. 8(b) is a graph illustrating clock and phase detection signals in accordance with a preferred embodiment of the present invention.

FIG. 8(c) is a graph of phase difference vs. control voltage variation in accordance with a preferred embodiment of the present invention.

DESCRIPTION OF THE PREFERRED EMBODIMENTS

Spread Spectrum Phase Modulation and EMI Reduction

Figure 4A:
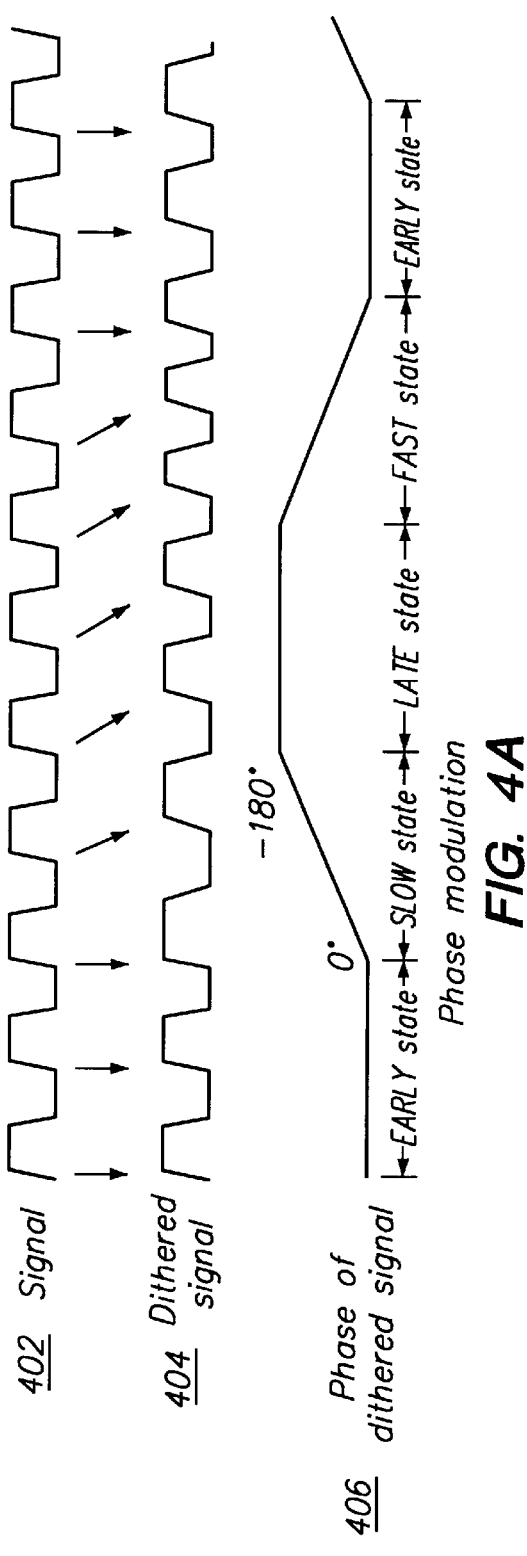
FIG. 4(a) is a graph illustrating phase modulation of a signal in accordance with a preferred embodiment of the present invention.

FIG. 4(a) shows a signal waveform under phase modulation. The original and unmodulated signal 402 is shown in the top line of FIG. 4(a). The phase modulated, or dithered, signal 404 and its phase 406 are shown in the second and third lines of FIG. 4(a).

As shown, the phase 406 varies continuously between 0 degrees (EARLY state) and negative 180 degrees (LATE state). To prevent excessive phase change between the two successive phase values (EARLY state and LATE state), a SLOW state (EARLY to LATE transition) and a FAST state (LATE to EARLY transition) are inserted between transitions to and from EARLY and LATE states. In accordance with a preferred embodiment of the present invention, the SLOW and FAST states occupy at least 16 cycles, and the phase change between two successive cycles is limited to 12 degrees. Of course, within the scope of the present invention, the number of cycles occupied and the phase change between two successive cycles may vary from the particular numbers above.

Figure 4B:
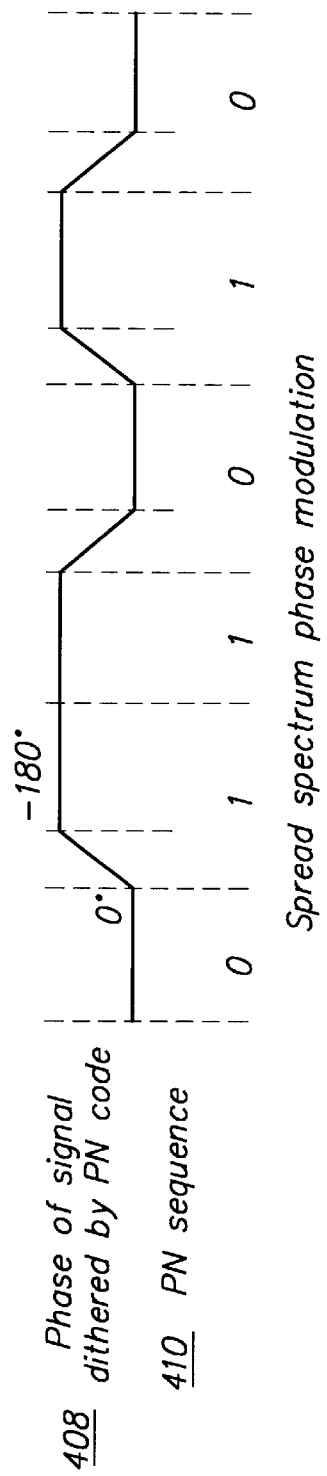
FIG. 4(b) is a graph illustrating the phase of the signal dithered by a pseudo-random code in accordance with a preferred embodiment of the present invention.

FIG. 4(b) is a graph illustrating the phase 408 of the signal dithered by a pseudo-random code (PN sequence) 410 in accordance with a preferred embodiment of the present invention. For purposes of illustration, the pseudo-random sequence 410 shown starts with the sequence 011010. Techniques for generating such pseudo-random sequences are known to those of ordinary skill in the pertinent art.

Figures 5A, 5B:
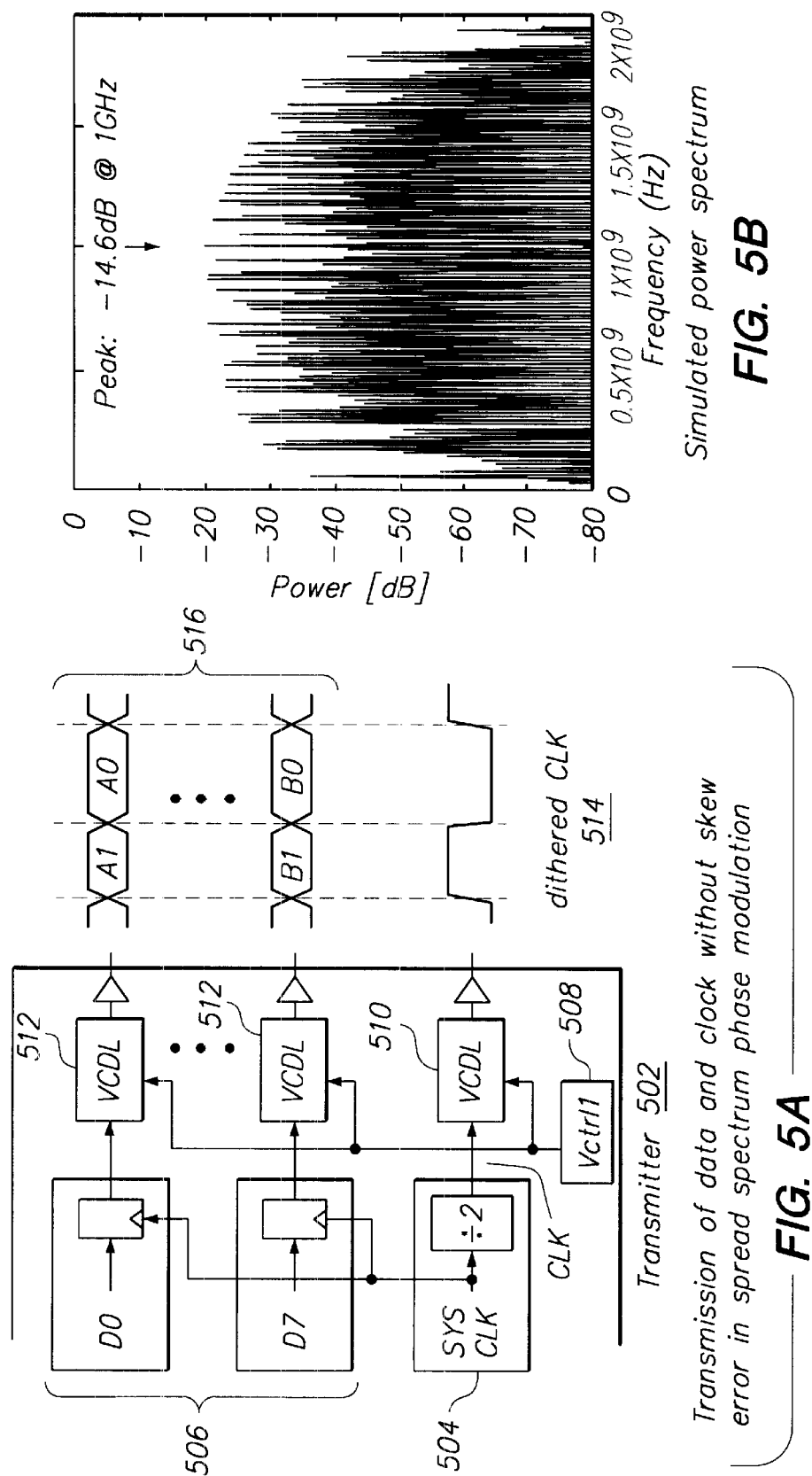
FIG. 5(a) is a schematic diagram illustrating a spread spectrum phase modulation communication system in accordance with a preferred embodiment of the present invention.
FIG. 5(b) is a graph illustrating the improved reduction of the peak values in the power spectrum when the spread spectrum phase modulation technique is applied in accordance with a preferred embodiment of the present invention.

When the phase modulation is controlled by a PN sequence 410 such as shown in FIG. 4(b), the resultant power spectrum will be spread like the power spectrum in FIG. 5(b). The power spectrum in FIG. 5(b) has peaks with a maximum power of negative 14.6 dB 1 GHz. In comparison, the power spectrum in FIG. 2(b) has peaks with a maximum power of 0 dB. Thus, applying spread spectrum phase modulation in this way to the signal results in a magnitude 14.6 dB reduction in peak EMI.

Figure 1:
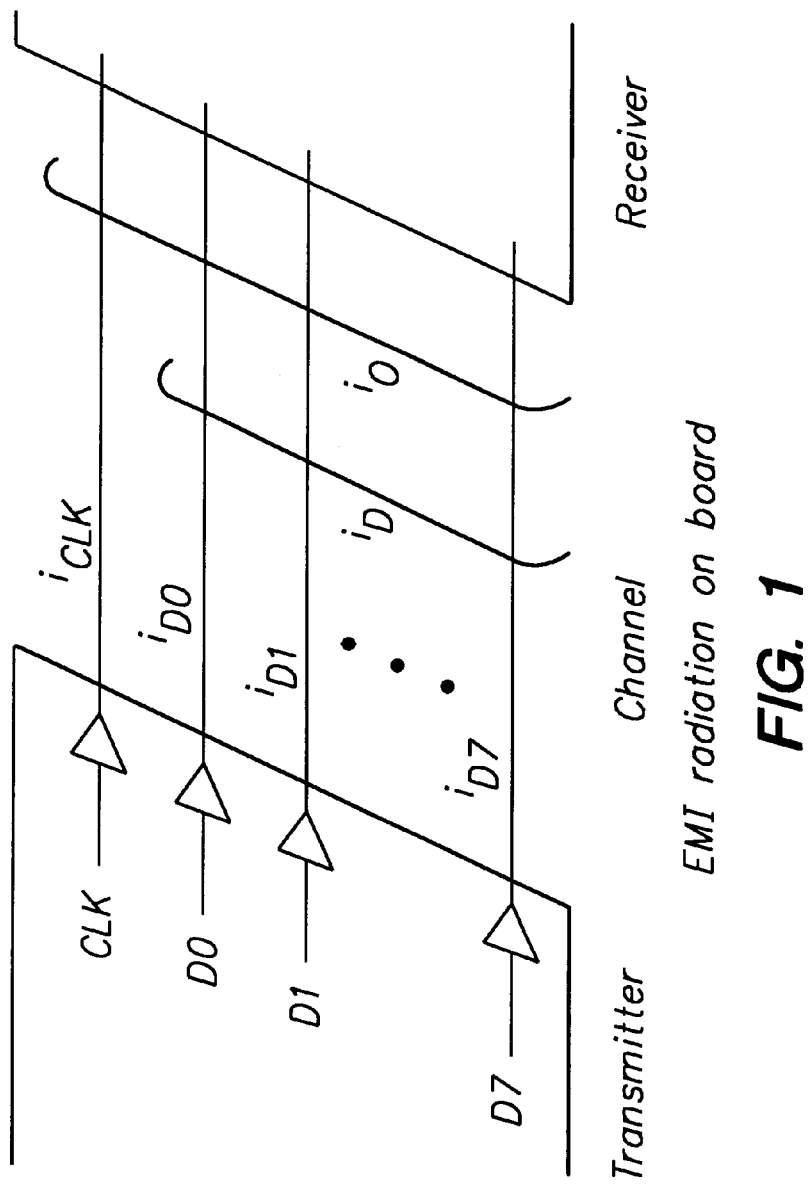
FIG. 1 is a schematic diagram showing a typical configuration including a transmitter, a receiver, and a channel comprising a clock line and 8 data lines.
Figure 3C:
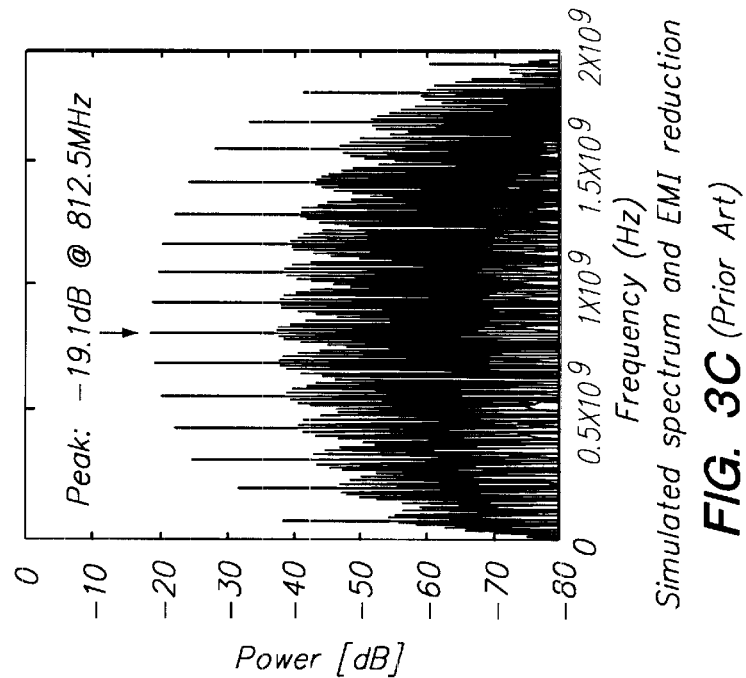
FIG. 3(c) is a graph illustrating the reduction of the peak values in the power spectrum when the direct-sequence spread spectrum technique is applied.
Figure 3A:
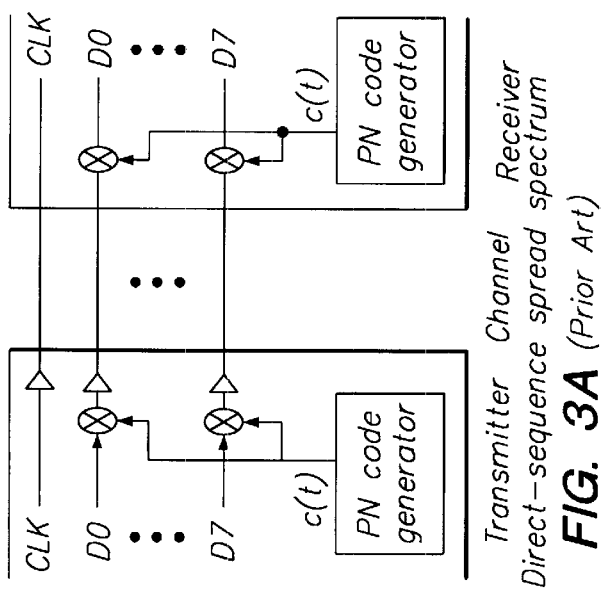
FIG. 3(a) is a schematic diagram showing a direct-sequence spread spectrum communication system, including pseudo-random code generators within a transmitter and a receiver.
Figure 3B:
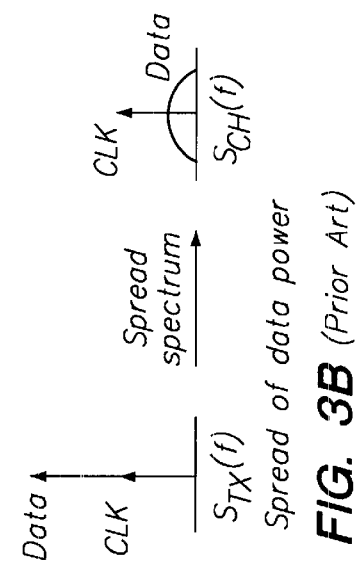
FIG. 3(b) is a graph illustrating the spreading of a data signal and the non-spreading of a clock signal by way of the direct-sequence spread spectrum technique.

Although the 14.6 dB reduction from this implementation of SSPM is substantial, it is less than the 19.1 dB reduction from the implementation of DSSS shown in FIG. 3(c). Nevertheless, this implementation of SSPM is advantageous over DSSS because, unlike DSSS, SSPM does not require a pseudo-random code generator in the receiver and so requires simpler circuitry in comparison to the circuitry for DSSS shown in FIG. 3(a).

A SSPM transmitter circuit 502 for parallel transmission of a clock signal and multiple data signals and for phase modulation of those clock and data signals is shown in FIG. 5(a). The circuit 502 includes: a clock signal source 504 for generating the clock signal (CLK); a plurality of data signal sources 506 for generating the multiple data signals (D0, D1, D2, . . . , D7); a control voltage source 508 for generating a control voltage (Vctrl1); a first voltage-controlled delay line 510 coupled to the clock signal source 504 to receive the clock signal and coupled to the control voltage source 508 to receive the control voltage, the first voltage-controlled delay line delaying the clock signal according to the control voltage; and a plurality of voltage-controlled delay lines 512 coupled to the plurality of data signal sources 506 to receive the multiple data signals and coupled to the control voltage source 508 to receive the control voltage, the plurality of voltage-controlled delay lines delaying the multiple data signals according to the control voltage. The output of the circuit 502 is also shown in FIG. 5(a). The first voltage-controlled delay line 510 outputs a dithered clock (dithered CLK) signal 514. The plurality of voltage-controlled delay lines 512 output dithered data signals 516.

Thus, the spread spectrum phase modulation (SSPM) technique can be applied to both clock and data without skew errors between data and clock as shown in FIG. 5(a). The absence of skew errors is achieved by phase-modulating the clock and data through voltage-controlled delay lines (VCDLs 510 and 512) of which delays are controlled by the same control voltage. It is desirable that the phase difference between maximum and minimum delays applied by the VCDLs should be 180 degrees. This is because as the phase difference between maximum and minimum delays gets away from 180 degrees, the EMI reduction gets smaller according to our simulations.

Effect of Increased Transition Time (ITT) of Data Outputs

In order to reduce the high frequency component of the current, increasing the transition time ($t_s$) is desirable. However, the slow edge rate cannot be applied to a clock signal, so EMI reduction on a clock signal is not expected.

Since the negative 19.1 dB peak at 812.5 MHz in the case of DSSS is due primarily to the clock signal, no further peak reduction would occur by increasing the transition time ($t_s$) in the case of DSSS. In contrast, since the negative 14.6 dB peak at 1 GHz in the case of SSPM is not due primarily to the clock signal, that peak will be substantially further reduced occur by increasing the transition time ($t_s$) in the case of SSPM.

Figure 6C:
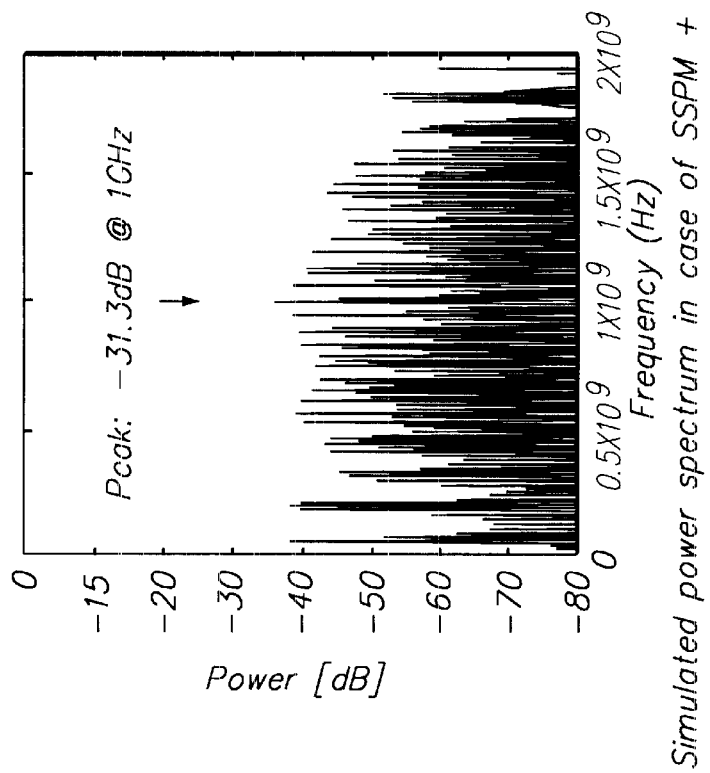
FIG. 6(c) is a graph illustrating the further improved reduction of the peak values in the power spectrum when the transition time is increased and the spread spectrum phase modulation technique is applied in accordance with a preferred embodiment of the present invention.
Figure 6A:
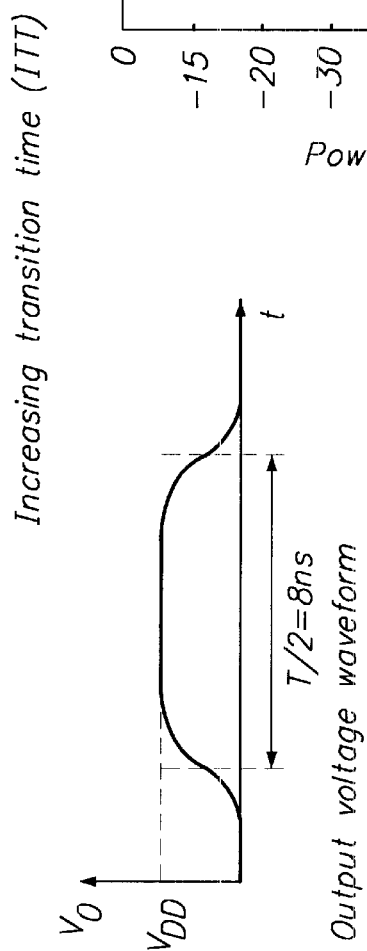
FIG. 6(a) is a graph illustrating an output voltage waveform having an increased transition time in accordance with a preferred embodiment of the present invention.
Figure 6B:
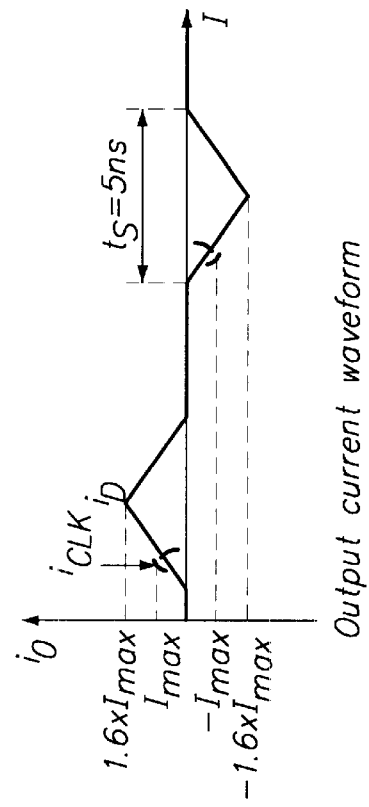
FIG. 6(b) is a graph illustrating an output current waveform having an increased transition time in accordance with a preferred embodiment of the present invention.

FIG. 6(a) is a graph illustrating an output voltage waveform having an increased transition time ($t_s$) in accordance with a preferred embodiment of the present invention. The increased transition time ($t_s$) is more distinctly shown in FIG. 6(b) which shows the corresponding output current waveform. The transition time ($t_s$) for the waveforms shown in FIGS. 6(a) and 6(b) is 5 nanoseconds (ns). In comparison, the transition time ($t_s$) for the waveforms shown in FIGS. 2(a) and 2(b) is 1 nanosecond (ns).

FIG. 6(c) is a graph illustrating the further improved reduction of the peak values in the power spectrum when the transition time ($t_s$) is increased to 5 ns, and the spread spectrum phase modulation technique is applied in accordance with a preferred embodiment of the present invention.

As can be seen from FIG. 6(c), the peak at 1 GHz is further reduced to negative 31.3 dB.

Figure 7:
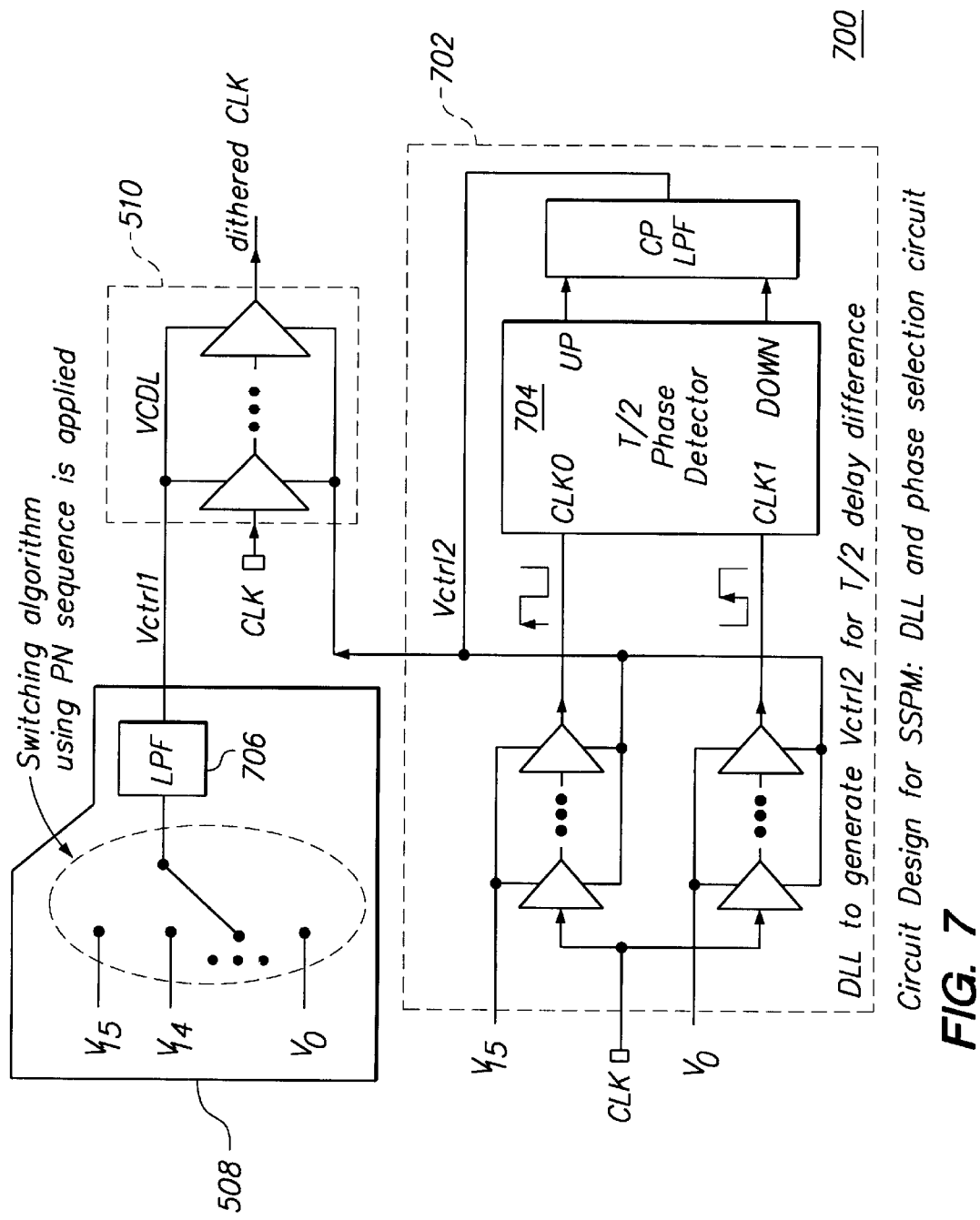
FIG. 7 is a schematic diagram showing SSPM transmitter circuitry in accordance with a preferred embodiment of the present invention.

FIG. 7 is a schematic diagram showing SSPM transmitter circuitry 700 in accordance with a preferred embodiment of the present invention. The transmitter circuitry 700 includes the phase selection circuit (PSC) 508 and a delay lock loop (DLL) 702. Both the PSC 508 and the DLL 702 supply control voltages to a voltage-controlled delay line (VCDL) 510. The same or similar circuitry would be used to supply control voltages to the other voltage-controlled delay lines 512.

The transmitted signal (the CLK signal in the instance shown in FIG. 7) is modulated by the VCDL 510. The delay applied by the VCDL 510 is controlled by two control voltages: Vctrl1 and Vctrl2.

The generation of Vctrl1 by the PSC 508 is controlled by a switching algorithm, and Vctrl1 is used for interpolating the delay applied by the VCDL 510. For example, the VCDL 510 generates a minimum delay (0) when Vctrl1 is switched to $V_{15}$. As another example, the VCDL 510 generates a maximum delay (T/2) when Vctrl1 is switched to $V_0$. According to a preferred embodiment of the present invention, Vctrl1 is continuously switched from $V_{15}$ to $V_{14}$, $V_{13}$, $V_{12}$, and so on to $V_0$, then to $V_1$, $V_2$, $V_3$, and so on to $V_{15}$, etc.

The DLL 702 generates Vctrl2 corresponding to a half period (T/2) delay difference. The DLL 702 includes a T/2 Phase Detector 704 with CLK0 and CLK1 input signals, and UP and DOWN output signals. The DLL 702 adjust$_s$-Vctrl2 until a rising edge of the CLK0 signal and the falling edge of the CLK1 signal are aligned.

As Vctrl1 is continuously switched between $V_{15}$ and $V_0$ according to the switching algorithm using a pseudo-random sequence 410, the delay applied by the VCDL 510 varies between 0 and T/2. Furthermore, because a low-pass filter 706 is used in the generation of Vctrl1, the phase and delay vary smoothly.

FIG. 8(a) is a schematic diagram showing circuitry for a T/2 Phase Detector 704 in accordance with a preferred embodiment of the present invention. The T/2 Phase Detector 704 comprises a dynamic phase detector that has two input signals CLK0 and CLK1 and two output signals UP and DOWN.

For generating the UP signal output, the CLK1 signal is input to a first inverter 802 and to gates of a first PMOS transistor 804 and a first NMOS transistor 806. The source of the first PMOS transistor 804 is coupled to a supply voltage, and the drain of the first PMOS transistor 804 is coupled to the source of a second PMOS transistor 808. The source of the first NMOS transistor 806 is coupled to the drain of the second PMOS transistor 808, and the drain of the first NMOS transistor 806 is coupled to an electrical ground. The CLK0 signal is input to a second inverter 810.

In addition, the output of the first inverter 802 is coupled to a gate of a third PMOS transistor 812. The output of the second inverter 810 and the gate of the second PMOS transistor 808 are coupled to a gate of a second NMOS transistor 814. The node between the drain of the second PMOS transistor 808 and the source of the first NMOS transistor 806 is coupled to the gate of a third NMOS transistor 816.

Furthermore, the source of the third PMOS transistor 812 is coupled to a supply voltage, and the drain of the third PMOS transistor is coupled to an input of a third inverter 818. The source of the second NMOS transistor 814 is also coupled to the input of the third inverter 818, and the drain of the second NMOS transistor 814 is coupled to the source of the third NMOS transistor 816. The drain of the third NMOS transistor 816 is coupled to an electrical ground. Finally, the output of the third inverter 818 comprises the UP output signal.

For generating the DOWN signal output, the circuitry is the same as that for generating the UP signal, except that the CLK0 and CLK1 input signals are reversed as shown in the bottom half of FIG. 8(a).

The circuitry shown in FIG. 8(a) comprises a dynamic phase detector with fewer transistors and higher precision than prior dynamic phase detectors. Owing to the high precision of its dynamic logic operation, the T/2 Phase Detector 704 can operate without any phase offset.

FIG. 8(b) is a graph illustrating clock and phase detection signals in accordance with a preferred embodiment of the present invention. As shown in FIG. 8(b), the widths of UP and DOWN pulses are proportional to the phase difference of the inputs CLK0 and CLK1. Further, there are no pulses in lock state.

FIG. 8(c) is a graph of phase difference vs. control voltage variation in accordance with a preferred embodiment of the present invention.

What is claimed is:

1. A transmitter for spread spectrum phase modulation and parallel transmission of a clock signal and multiple data signals, the transmitter comprising:
   a clock signal source for generating the clock signal;
   a plurality of data signal sources for generating the multiple data signals;
   a control voltage source for generating a first control voltage;
   a first voltage-controlled delay line coupled to the clock signal source to receive the clock signal and coupled to the control voltage source to receive the first control voltage, the first voltage-controlled delay line delaying the clock signal according to the first control voltage; and
   a plurality of voltage-controlled delay lines coupled to the plurality of data signal sources to receive the multiple data signals and coupled to the control voltage source to receive the first control voltage, the plurality of voltage-controlled delay lines delaying the multiple data signals according to the first control voltage.

2. The transmitter of claim 1, wherein the control voltage source applies a switching algorithm using a pseudo-random sequence.

3. The transmitter of claim 1, further comprising
   a delay-locked loop for generating a second control voltage; and
   where the first voltage-controlled delay line is further coupled to the delay-locked loop to receive the second control voltage, and the second control voltage corresponds to a maximum delay difference.

4. The transmitter of claim 3, wherein the delay-locked loop comprises:
   a dynamic phase detector for adjusting the second control voltage.

5. A method of transmitting a clock signal and parallel data signals, comprising:
   generating the clock signal using a clock signal source;
   receiving the parallel data signals from a plurality of data signal sources;
   providing the clock signal to a clock delay line that is coupled to the clock signal source and that is coupled to a control source to receive a control signal to delay the clock signal;

providing the parallel data signals to a plurality of data delay lines that are coupled to the data signal sources and that are coupled to the control source to receive the control signal to delay the parallel data signals;

controlling a common delay applied to the clock signal and to the parallel data signals by applying a common control signal to the clock delay line and to the data delay lines;

varying the common control signal to vary the phase of the clock and multiple data signals between an EARLY and a LATE phase; and providing intermediate transition phases between the EARLY and LATE phases; wherein the transition phases occupy at least 16 cycles.

6. The method of claim 5 further comprising:

dithering the common control signal in accordance with a pseudo-random sequence.

7. The method of claim 5 wherein the phase change between two successive transition phases is limited to a maximum of 12 degrees.

8. A method of transmitting a clock signal and parallel data signals, comprising:

transmitting a clock signal on a clock line;

transmitting the parallel data signals on a plurality of data lines;

wherein spread spectrum phase modulation is applied to the clock signal and the parallel data signals to minimize skew between the clock signal and the parallel data channels;

varying the phase of the clock and multiple data signals between an EARLY and a LATE phase; and providing intermediate transition phases between the EARLY and LATE phases, wherein the transition phases occupy at least 16 cycles.

9. The method of claim 8 wherein spread spectrum phase modulation is applied by dithering the clock signal and the parallel data channels in accordance with a pseudo-random sequence.

\* \* \* \* \*